US012752732B2

(12) United States Patent
Ge et al.

(10) Patent No.: US 12,752,732 B2
(45) Date of Patent: Oct. 6, 2026

(54) SAFETY BELT AND SAFETY BELT HEATING APPARATUS

(71) Applicant: Autoliv Development AB, Vargarda (SE)

(72) Inventors: Liang Ge, Shanghai (CN); Qihua Zhang, Shanghai (CN); Fuqing Gu, Suzhou (CN); Yue Teng, Shanghai (CN)

(73) Assignee: AUTOLIV DEVELOPMENT AB, Vargarda (SE)

( * ) Notice: Subject to any disclaimer, the term of this patent is extended or adjusted under 35 U.S.C. 154(b) by 118 days.

(21) Appl. No.: 18/880,071

(22) PCT Filed: Mar. 21, 2023

(86) PCT No.: PCT/CN2023/082745
§ 371 (c)(1),
(2) Date: Dec. 30, 2024

(87) PCT Pub. No.: WO2024/001319
PCT Pub. Date: Jan. 4, 2024

(65) Prior Publication Data

US 2026/0257644 A1 Sep. 3, 2026

(30) Foreign Application Priority Data

Jun. 30, 2022 (CN) ......................... 202221666459.1

(51) Int. Cl.
*B60R 22/12* (2006.01)
*H05B 1/02* (2006.01)
*H05B 3/56* (2006.01)

(52) U.S. Cl.
CPC .......... *B60R 22/12* (2013.01); *H05B 1/0236* (2013.01); *H05B 3/56* (2013.01); *H05B 2203/003* (2013.01); *H05B 2203/035* (2013.01)

(58) Field of Classification Search
CPC .............................. B60R 22/12; H05B 1/0236
See application file for complete search history.

(56) References Cited

U.S. PATENT DOCUMENTS

2017/0313278 A1* 11/2017 Marew .................... B60R 22/00
2017/0361744 A1* 12/2017 Persson ................ B60N 2/5685
(Continued)

FOREIGN PATENT DOCUMENTS

CA 3019306 A1 * 10/2017 ............. A61F 7/007
CN 215851131 U 2/2022
(Continued)

*Primary Examiner* — Nicole T Verley
(74) *Attorney, Agent, or Firm* — Dickinson Wright PLLC

(57) ABSTRACT

A safety belt body and a safety belt heating apparatus. The safety belt body includes: a tubular webbing having a tubular space therein; a heating assembly secured in the tubular space, the heating assembly including a first printed circuit board; and a protector, including a second printed circuit board, the second printed circuit board being electrically connected to the first printed circuit board and being used for transmitting a temperature signal and an electrical signal from the heating assembly, wherein the protector further includes a housing, the housing being sleeved and secured on the outside of the tubular webbing, the housing having disposed therein an accommodating space, and the first printed circuit board and the second printed circuit board being located in the accommodating space.

10 Claims, 6 Drawing Sheets

(56) References Cited

U.S. PATENT DOCUMENTS

| | | | | |
|---|---|---|---|---|
| 2019/0329707 | A1* | 10/2019 | Okayasu | B60Q 9/00 |
| 2020/0156589 | A1* | 5/2020 | Babin | B60N 2/265 |

FOREIGN PATENT DOCUMENTS

| | | | | | |
|---|---|---|---|---|---|
| CN | 216231840 | U | * | 4/2022 | B60N 2/5685 |
| CN | 218085419 | U | | 12/2022 | |
| CN | 218616563 | U | | 3/2023 | |
| CN | 220281332 | U | * | 1/2024 | H05B 1/02 |
| CN | 118082742 | A | * | 5/2024 | A61M 21/02 |
| CN | 221437944 | U | * | 7/2024 | |
| CN | 118722487 | A | * | 10/2024 | H05B 3/34 |
| CN | 110775014 | B | * | 11/2024 | H05B 3/0004 |
| DE | 102006011646 | A1 | | 9/2006 | |
| DE | 102017110590 | A1 | * | 11/2018 | B60R 21/01544 |
| DE | 102019004764 | A1 | * | 1/2021 | B60R 22/12 |
| DE | 102019133484 | A1 | * | 6/2021 | B60R 22/12 |
| DE | 102020115135 | A1 | * | 12/2021 | B60R 22/12 |
| DE | 102020133807 | A1 | * | 6/2022 | B60H 1/2225 |
| DE | 102022101784 | A1 | * | 7/2023 | B60R 22/12 |
| DE | 102023129708 | A1 | * | 4/2025 | H05B 3/06 |
| DE | 202025106886 | U1 | * | 11/2025 | B60R 22/12 |
| JP | 2014151753 | A | | 8/2014 | |
| JP | 2014201082 | A | * | 10/2014 | |
| WO | WO-2011053015 | A2 | * | 5/2011 | B60R 22/18 |
| WO | WO-2022194831 | A1 | * | 9/2022 | B60R 22/12 |
| WO | WO-2024198577 | A1 | * | 10/2024 | H05B 1/02 |
| WO | WO-2024223440 | A1 | * | 10/2024 | B60R 22/12 |

* cited by examiner

SAFETY BELT AND SAFETY BELT HEATING APPARATUS

TECHNICAL FIELD

The present utility model relates to the technical field of safety belts, and in particular to a safety belt body and a safety belt heating apparatus.

BACKGROUND

In the related art, a safety belt is often used in a vehicle or an entertainment setting to ensure the safety of a passenger. However, in cold weather, the safety belt has poor flexibility and is fragile, resulting in a great reduction in the safety performance of the safety belt.

In addition, when a safety belt for a vehicle is in contact with the body of a passenger, the cold safety belt tends to absorb the body heat of the passenger, lessening the comfort of use of the passenger. Therefore, providing safety belts with a heating function is a future development trend. Heated safety belts can increase the willingness of the passenger to use the safety belt, and allow the passenger to take off a heavy coat in the vehicle to improve his or her comfort, thereby creating a warm riding experience.

SUMMARY

To overcome the problems in the related art, the present disclosure provides a safety belt body and a safety belt heating apparatus.

According to a first aspect of embodiments of the present disclosure, the present disclosure provides a safety belt body, comprising: a tubular webbing having a tubular space therein; a heating assembly secured in the tubular space, the heating assembly comprising a first printed circuit board and being used for monitoring the temperature and generating a temperature signal; and a protector, comprising a second printed circuit board, the second printed circuit board being electrically connected to the first printed circuit board and being used for transmitting the temperature signal and an electrical signal from the heating assembly, wherein the protector further comprises a housing, the housing being sleeved and secured on the outside of the webbing, the housing having disposed therein an accommodating space, and the first printed circuit board and the second printed circuit board being located in the accommodating space.

In some embodiments, the first printed circuit board is provided with pins, the second printed circuit board is provided with pin connectors, the second printed circuit board is located outside the webbing, and respective ends of the pins are capable of piercing through the webbing to be electrically connected to the pin connectors.

In some embodiments, the safety belt body further comprises a fastener, and an inner wall of the housing is provided with a pin slot. An end of the fastener is inserted into the pin slot after sequentially passing through the first printed circuit board, the webbing, and the second printed circuit board, to achieve securing between the first printed circuit board and the second printed circuit board and securing between the housing and the webbing.

In some embodiments, the housing comprises: a first housing located on a first side of the webbing, wherein the first housing is provided with an engagement fastener; and a second housing located on a second side of the webbing, wherein the second housing is provided with an engagement hook. The engagement hook engages with the engagement fastener to achieve a detachable connection between the first housing and the second housing.

In some embodiments, the protector further comprises: an ECU connector disposed outside the housing; and a connecting wire, wherein two ends of the connecting wire are respectively electrically connected to the second printed circuit board and the ECU connector.

In some embodiments, the heating assembly is secured to the webbing via an adhesive, and the adhesive is applied to one or both sides of the heating assembly.

In some embodiments, the adhesive has a melting point of 120° C. to 140° C., and is cured via heating or cured at room temperature to adhere the heating assembly to the webbing.

In some embodiments, the heating assembly further comprises: a base body comprising a connecting portion located at an end portion of the base body; and a heating wire arranged along the length direction of the base body and secured to the base body. The first printed circuit board is disposed on the connecting portion, and is electrically connected to the heating wire, the first printed circuit board is provided with a thermistor, one end of the thermistor is connected to the first printed circuit board, and the other end thereof extends to between sections of the heating wire to measure the temperature of the heating wire.

In some embodiments, the base body comprises a nylon material or a nonwoven fabric material.

According to a second aspect of the embodiments of the present disclosure, the present disclosure provides a safety belt heating apparatus, comprising: a retractor; a securing device; the safety belt body according to the first aspect, the safety belt body comprising a first end and a second end that are opposite to each other, the first end being connected to the retractor, and the second end being connected to the securing device; a tongue sleeved on the outside of the safety belt body and capable of sliding in the length direction of the safety belt body; a webbing clip sleeved on the safety belt body and used for limiting the position of the tongue; and an annular guide plate sleeved on the outside of the safety belt body and used for guiding the safety belt body, the safety belt body being capable of sliding relative to the annular guide plate.

The technical solutions provided in the embodiments of the present disclosure may achieve the following beneficial effects: by arranging the protector, the temperature signal and the electrical signal from the heating assembly can be transmitted, and an ECU can control the temperature of the heating assembly on the basis of the temperature signal, to prevent the temperature of the heating assembly from being excessively high or excessively low, thereby improving the comfort of use of a passenger. In addition, the housing of the protector can protect electronic components inside the housing, to prevent the components from being impacted, damaged, or corroded by moisture, impurities, etc., thereby extending the service life.

BRIEF DESCRIPTION OF THE DRAWINGS

The accompanying drawings, which are incorporated in and constitute a part of the present specification, illustrate embodiments consistent with the present disclosure, and are used to explain the principles of the present disclosure together with the specification.

DETAILED DESCRIPTION

Exemplary embodiments are described in detail herein, and examples of the exemplary embodiments are presented in the accompanying drawings. When the following description refers to the accompanying drawings, unless otherwise specified, the same numerals in different accompanying drawings represent the same or similar elements. The implementations described in the following exemplary embodiments are not representative of all implementations consistent with the present disclosure. Instead, the implementations are merely examples of apparatuses and methods consistent with some aspects of the present disclosure as recited in the appended claims.

Figure 1:
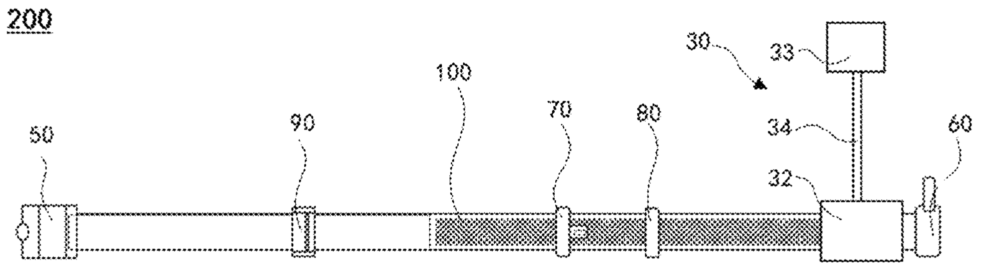
FIG. 1 is a schematic structural view of a safety belt heating apparatus according to an exemplary embodiment.

The present disclosure provides a safety belt heating apparatus 200. As shown in FIG. 1, the safety belt heating apparatus 200 includes a safety belt body 100, a retractor 50, and a securing device 60. The safety belt body 100 includes a first end and a second end that are opposite to each other. The first end is connected to the retractor 50, and the retractor 50 is used for retracting and releasing the safety belt body 100. The second end is connected to the securing device 60 which is used for securing the safety belt body 100 when a passenger uses the safety belt body.

The safety belt body 100 includes a tubular webbing 10, a heating assembly 20, and a protector 30. The heating assembly 20 is secured inside the tubular webbing 10. The protector 30 is secured on the outside of the tubular webbing 10. The protector 30 is electrically connected to the heating assembly 20. The protector 30 monitors the temperature of the heating assembly 20, and transmits a temperature signal in the form of an electrical signal.

As such, by arranging the protector 30, an ECU can receive the temperature signal transmitted by the protector 30, and therefore, the ECU can monitor and control the temperature of the heating assembly 20 in real time on the basis of the temperature signal, to prevent the temperature of the heating assembly 20 from being excessively high or excessively low, thereby improving the comfort of use of the passenger. In addition, a housing of the protector 30 can protect electronic components inside the housing, to prevent the components from being impacted, damaged, or corroded by moisture, impurities, etc., thereby extending the service life of the protector 30 and even the entire safety belt heating apparatus 200.

In addition, still as shown in FIG. 1, the protector 30 is disposed at the second end of the safety belt body 100, so that an occupied space can be reduced and pressure of the protector 30 on the passenger can be avoided. In other embodiments, the protector 30 may alternatively be disposed at the first end of the safety belt body 100, or the protector 30 may be disposed at any position of the safety belt body 100 according to actual space or design requirements. This is not specifically limited herein.

Specifically, the tubular webbing 10 has a tubular space therein, and the tubular webbing 10 is more flexible, which can prevent wrinkles from forming on the webbing 10 and affecting the appearance and use strength of the webbing 10.

The heating assembly 20 is secured in the tubular space of the webbing 10. The heating assembly 20 may be secured to the webbing 10 by means of sewing, riveting, an adhesive, etc. In this embodiment of the present disclosure, the heating assembly 20 is secured to the webbing 10 via an adhesive, and the adhesive is applied to one or both sides of the heating assembly 20.

Further, the tubular webbing 10 may be an integrally woven hollow webbing, or may be a tubular webbing 10 formed by folding a sheet-like webbing.

When the webbing 10 is an integrally woven hollow webbing, the heating assembly 20 is inserted into the integrally formed hollow webbing after the adhesive is applied to one or both sides of the heating assembly 20. The adhesive may have a melting point of 120° C. to 140° C., and is cured via heating or cured at room temperature to bond the heating assembly 20 to an inner wall of the webbing 10, thereby adhering the heating assembly 20 to the tubular webbing 10.

Alternatively, after the adhesive is applied to both sides of the heating assembly 20, the heating assembly 20 may be placed on the webbing 10, so that one side of the heating assembly 20 is bonded to the webbing 10, and then the webbing 10 may be folded in half, so that the webbing 10 is bonded to the other side of the heating assembly 20. After being cured via heating or cured at room temperature, the adhesive also enables the webbing 10 to be adhered to the heating assembly 20.

It should be noted that the manners of securing the heating assembly 20 and the webbing 10 in the foregoing embodiment are merely exemplary, and are not intended to limit the scope of protection of the present disclosure. For example, the securing may be performed via high-frequency welding. Therefore, all manners capable of securing the heating assembly 20 to the webbing 10 in the art fall within the scope of protection of the present disclosure, and are not exhaustively listed.

Figure 2:
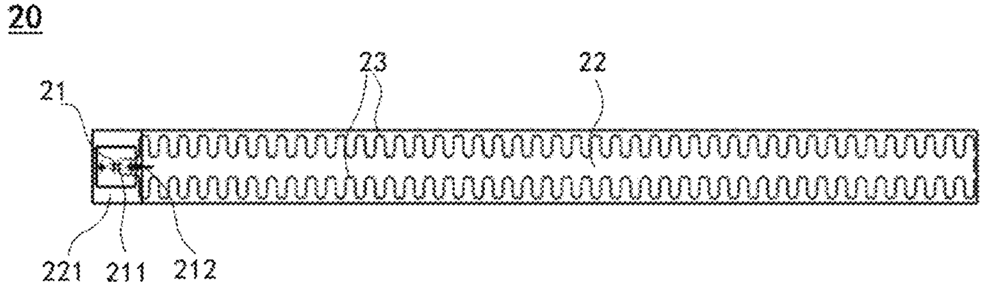
FIG. 2 is a schematic structural view of a heating assembly according to an exemplary embodiment.
Figure 3:
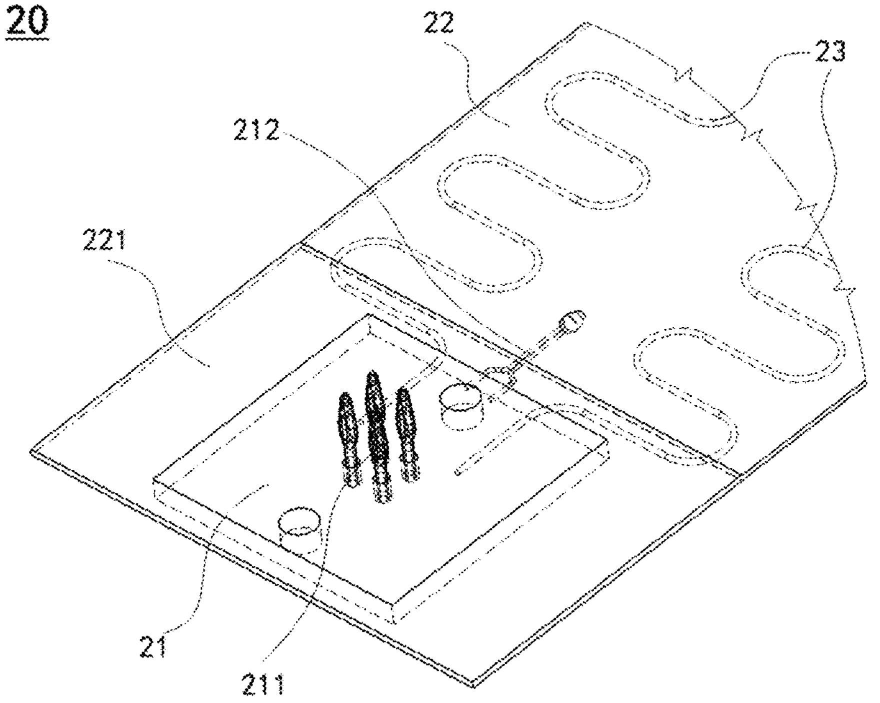
FIG. 3 is a schematic view of a partial structure in FIG. 2.

As shown in FIG. 2 and FIG. 3, the heating assembly 20 includes a first printed circuit board 21, a base body 22, and a heating wire 23.

Specifically, the base body 22 may be made of a nylon material or a nonwoven fabric material, and the base body 22 may be of an elongated sheet-like structure. It should be noted that the materials of the base body 22 that are listed above are merely exemplary, and are not intended to limit the scope of protection of the present disclosure. In other embodiments, the base body 22 may be another type of textile, for example, a woven fabric material such as cotton linen.

One or more heating wires 23 may be disposed. When the heating assembly 20 is provided with a plurality of heating wires 23, the plurality of heating wires 23 may be arranged in parallel along the length direction of the base body 22 and secured to an inner wall or a surface of the base body 22. The heating wire 23 may extend straight, or may extend in a curved configuration.

In the present embodiment of the present disclosure, the heating wire 23 has a curved configuration. Since the safety belt body 100 needs to be used a plurality of times, the curved heating wire 23 can reduce the probability that the heating wire 23 will be broken after being bent a plurality of times, so that the service life is extended.

In the present embodiment, as shown in FIG. 1, the protector 30 is disposed at a position near the second end of the safety belt body 100. Therefore, the base body 22 includes a connecting portion 221 located at an end portion of the base body 22, and the first printed circuit board 21 is disposed on the connecting portion 221. The first printed circuit board 21 is electrically connected to the heating wire 23, and is used for transmitting the temperature signal to the ECU. The ECU generates a control command on the basis of the temperature signal, and feeds back the control command to the heating wire 23, to control an increase or a decrease in the temperature of the heating wire 23.

The first printed circuit board 21 includes a thermistor 212, one end of the thermistor 212 is connected to the first printed circuit board 21, and the other end thereof extends to between sections of the heating wire 23 to measure the temperature of the heating wire 23. The thermistor 212 may be a negative temperature coefficient (NTC) thermistor 212, which is a sensitive component of which the resistance decreases as the temperature increases. Therefore, when acting as a temperature sensor, the NTC thermistor 212 may be used for measuring the temperature of the heating wire 23, and converting the temperature into a temperature signal and transmitting the temperature signal to an ECU connector 33 connected to a second printed circuit board 31.

Figure 5:
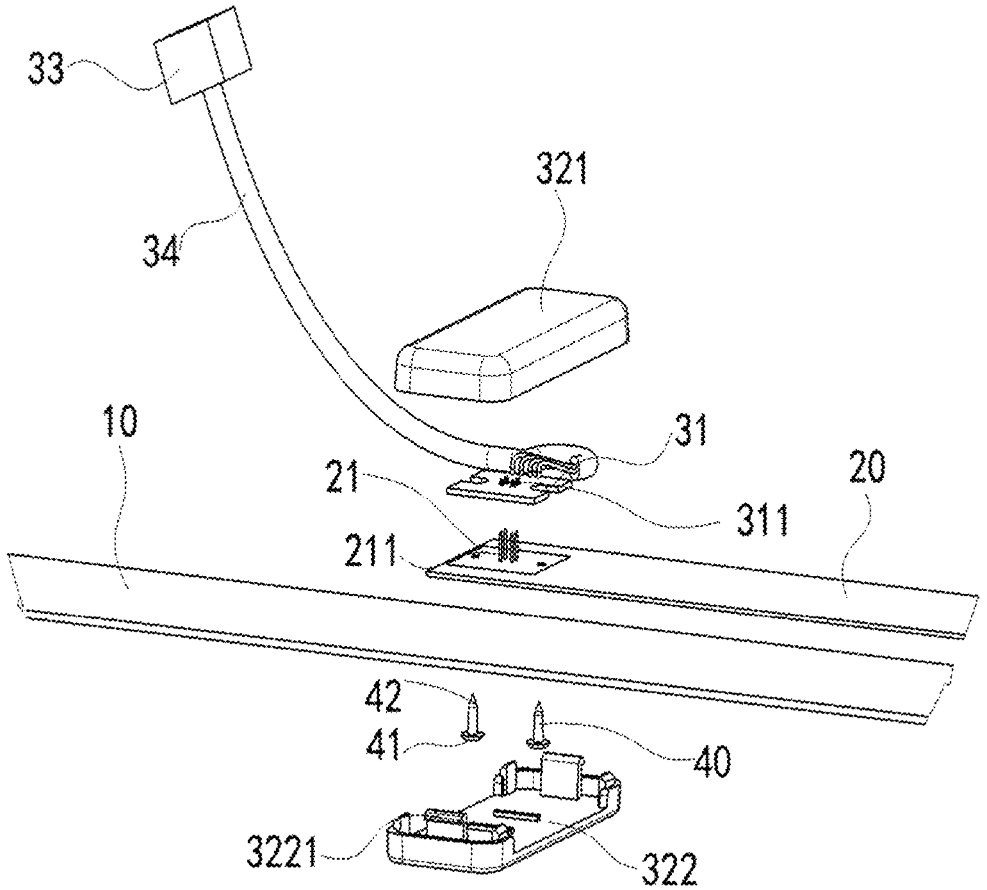
FIG. 5 is a schematic exploded view of a protector according to an exemplary embodiment.
Figure 6:
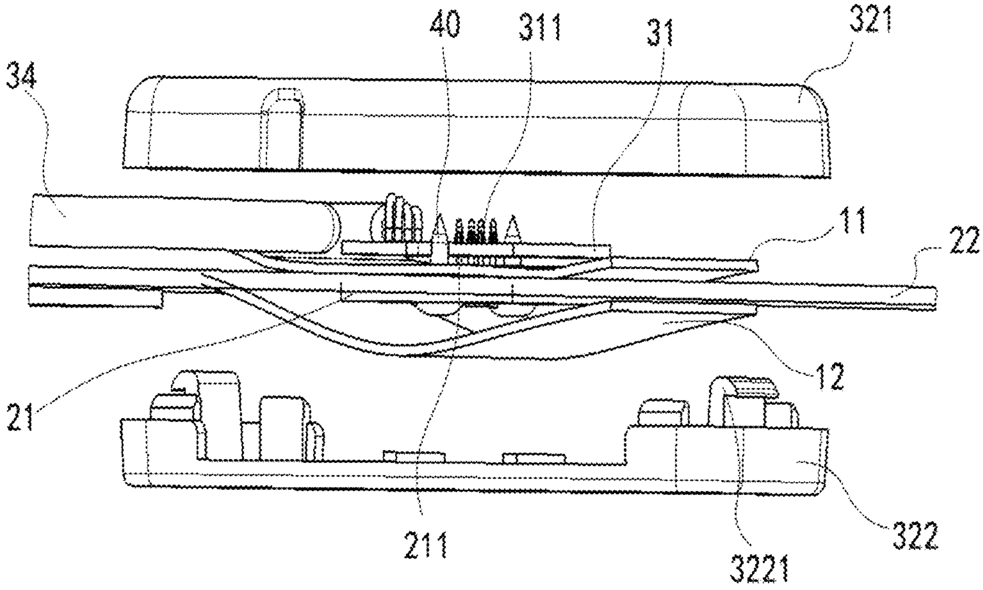
FIG. 6 is a schematic exploded view of a protector according to an exemplary embodiment viewed from another angle.

As shown in FIG. 5 and FIG. 6, the protector 30 includes the second printed circuit board 31. The second printed circuit board 31 is electrically connected to the first printed circuit board 21, and is used for transmitting the temperature signal and the electrical signal from the heating assembly 20.

Further, the first printed circuit board 21 is provided with pins 211 (as shown in FIG. 3, FIG. 5, and FIG. 6), and the second printed circuit board 31 is provided with pin connectors 311 (as shown in FIG. 5 and FIG. 6).

At least three pins 211 may be disposed. Two of the pins 211 are a positive-electrode pin and a negative-electrode pin, respectively, are used for completing the circuit to transmit the electrical signal, and can supply power to the first printed circuit board 21, the second printed circuit board 31, the heating wire 23, etc. At least one of the pins 211 is used for transmitting the temperature signal generated by the NTC thermistor 212 connected to the first printed circuit board 21.

In this embodiment of the present disclosure, four pins 211 are disposed. Two of the pins 211 are used for transmitting the temperature signal generated by the NTC thermistor 212 connected to the first printed circuit board 21, and the remaining two pins 211 are used for transmitting the electrical signal.

As shown in FIG. 6, since the first printed circuit board 21 is located inside the webbing 10, the second printed circuit board 31 is located outside the webbing 10, and respective ends of the pins 211 are electrically connected to the pin connectors 311 by piercing through the webbing 10, the first printed circuit board 21 can transmit the temperature signal from the heating wire 23 to the second printed circuit board 31 via the pins 211.

As such, the first printed circuit board 21 and the second printed circuit board 31 are connected to each other via the pins 211, so that damage to the webbing 10 can be reduced, thereby avoiding weakening the strength of the webbing 10, and extending the service life of the webbing 10.

Figure 4:
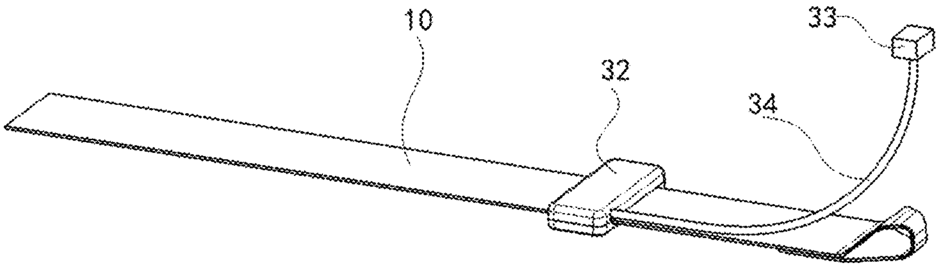
FIG. 4 is a schematic three-dimensional view of a protector according to an exemplary embodiment.

Further, as shown in FIG. 4, the protector 30 further includes a housing 32, the ECU connector 33, and a connecting wire 34. The housing 32 is sleeved and secured on the outside of the webbing 10, the housing 32 has disposed therein an accommodating space, and the first printed circuit board 21 and the second printed circuit board 31 are located in the accommodating space. The housing 32 can protect the first printed circuit board 21 and the second printed circuit board 31.

The ECU connector 33 is disposed outside the housing 32, and is electrically connected to the second printed circuit board 31 via the connecting wire 34. The ECU connector 33 is used for being electrically connected to the vehicle-mounted ECU. The thermistor 212 obtains the temperature of the heating wire 23 through measurement, the temperature signal is transmitted to the ECU after sequentially passing through the first printed circuit board 21, the pins 211, the second printed circuit board 31, the connecting wire 34, and the ECU connector 33, and the ECU feeds back temperature control for the heating wire 23 according to the temperature signal, thereby achieving overall temperature control for the heating assembly 20 of the safety belt body 100.

Figure 7:
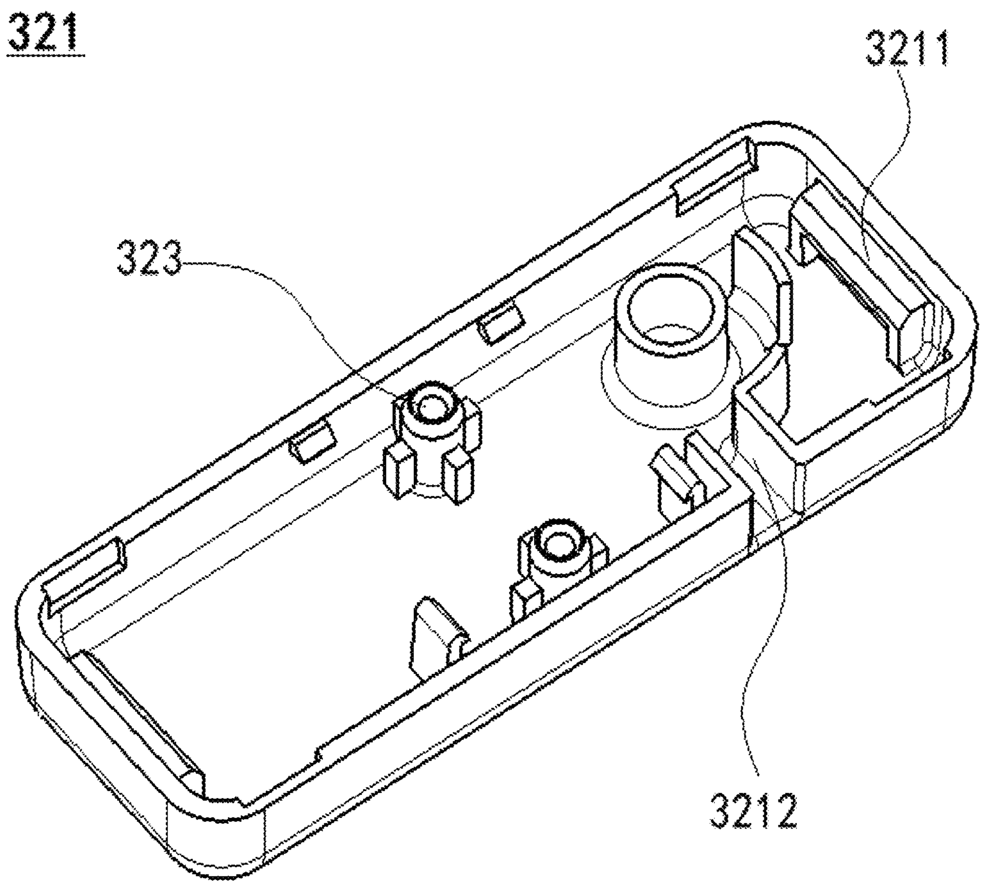
FIG. 7 is a schematic three-dimensional view of a first housing according to an exemplary embodiment.

Further, as shown in FIG. 5 and FIG. 6, the safety belt body 100 further includes a fastener 40, and as shown in FIG. 7, an inner wall of the housing 32 is provided with a pin slot 323. The fastener 40 is used for securing and positioning the first printed circuit board 21 and the second printed circuit board 31.

The fastener 40 may include a large head end 41 and a piercing end 42, and the fastener 40 is inserted into the pin slot 323 after sequentially passing through the first printed circuit board 21, the webbing 10, and the second printed circuit board 31, to achieve securing between the second printed circuit board 31 and the first printed circuit board 21, securing between the second printed circuit board 31 and the webbing 10, and securing between the housing 32 to the webbing 10.

The large head end 41 of the fastener 40 may be located outside the webbing 10, or may be located inside the webbing 10. When the large head end 41 of the fastener 40 is located outside the webbing 10, the piercing end 42 of the fastener 40 needs to pass through two layers of webbings 10. When the large head end 41 of the fastener 40 is located inside the webbing 10 (for example, in this embodiment of the present disclosure), the piercing end 42 of the fastener 40 needs to pass through only one layer of webbing 10. The fastener 40 may be a pin. The pin structure can avoid damage to the strength of the webbing 10.

Further, the housing 32 includes a first housing 321 and a second housing 322 that are detachably connected to each other. As shown in FIG. 5 and FIG. 6, the first housing 321 is located on a first side 11 of the webbing 10, and the second housing 322 is located on a second side 12 of the webbing 10.

Figure 8:
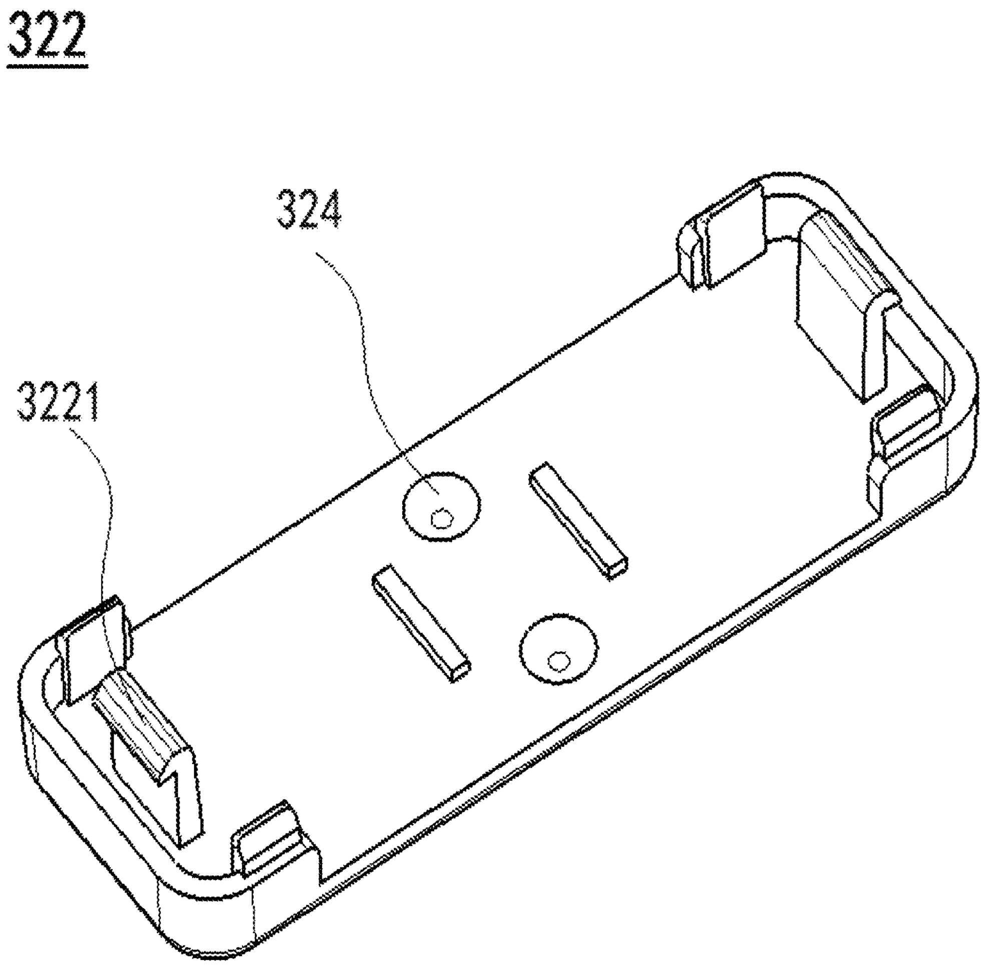
FIG. 8 is a schematic three-dimensional view of a second housing according to an exemplary embodiment.

As shown in FIG. 7, the first housing 321 is provided with an engagement fastener 3211. As shown in FIG. 5, FIG. 6, and FIG. 8, the second housing 322 is provided with an engagement hook 3221. The position of the engagement hook 3221 of the second housing 322 corresponds to the position of the engagement fastener 3211 of the first housing 321. The engagement hook 3221 engages with the engagement fastener 3211 to achieve a detachable connection between the first housing 321 and the second housing 322.

The detachable connection between the first housing 321 and the second housing 322 facilitates assembly and disassembly of the housing 32 and maintenance and replacement of components inside the housing 32. In this embodiment of the present disclosure, the engagement hook 3221 and the engagement fastener 3211 are located at an end portion of the housing 32. In other embodiments, the engagement hook 3221 and the engagement fastener 3211 may alternatively be located in the middle of the housing 32. Therefore, the engagement hook 3221 and the engagement fastener 3211 may be disposed at any position of the housing 32 according to the design requirement. This is not specifically limited herein.

In addition, in this embodiment of the present disclosure, the pin slot 323 is disposed on an inner wall of the first housing 321, and a clearance hole 324 for providing clearance for the large head end 41 of the fastener 40 may also be disposed at a position, on an inner wall of the second housing 322, corresponding to the pin slot 323. The inner wall of the first housing 321 is further provided with a connecting wire groove 3212 for limiting and guiding the connecting wire 34.

Based on the same inventive concept, the present disclosure further provides a safety belt heating apparatus 200. As shown in FIG. 1, it can be learned from the foregoing content that the safety belt heating apparatus 200 includes a safety belt body 100, a retractor 50, and a securing device 60, and further includes a tongue 70, a webbing clip 80, and an annular guide plate 90.

The annular guide plate 90 is sleeved on the outside of the safety belt body 100, and is usually secured to a seat, etc., such that the safety belt body 100 can slide relative to the annular guide plate 90, thereby guiding the safety belt body 100.

The tongue 70 is sleeved on the outside of the safety belt body 100, and is capable of sliding in the length direction of the safety belt body 100. Connecting the tongue 70 to the securing device 60 enables the safety belt body 100 to secure the passenger. The webbing clip 80 is sleeved on the safety belt body 100, and is used for limiting the position of the tongue 70.

The specific manner of the functions fulfilled in the safety belt heating apparatus 200 in the foregoing embodiment has been described in detail in the embodiment related to the safety belt body 100, and details are not described herein.

It can be understood that in the present disclosure, "a plurality of" means two or more, and other quantifiers are similar. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. The singular forms "a" and "the" are also intended to include plural forms, unless otherwise specified in the context clearly.

It may be further understood that the terms "first", "second", etc., are used to describe various structures, but these structures should not be limited by these terms. These terms are only used to distinguish between structures of the same type, and do not indicate a particular order or degree of importance. In practice, the terms "first", "second", etc., are used interchangeably. For example, without departing from the scope of the present disclosure, a first structure may also be referred to as a second structure, and similarly, a second structure may also be referred to as a first structure.

It can be further understood that an orientation or positional relationship indicated by the terms "center", "longitudinal", "lateral", "front", "back", "up", "down", "left", "right", "vertical", "horizontal", "top", "bottom", "inside", "outside", etc., is based on the orientation or positional relationship shown in the accompanying drawings, is only for the convenience of describing the embodiments and simplifying the description rather than indicating or implying that an apparatus or an element indicated must have a particular orientation, or be constructed and operated in a particular orientation.

It can be further understood that, unless otherwise specified, "connection" includes a direct connection between two units without other components and an indirect connection between two units with other elements.

It can be further understood that although operations in the embodiments of the present disclosure are described in a particular order in the accompanying drawings, it should not be construed as requiring these operations to be performed in the particular order shown or in a sequential order, or requiring all the operations shown to be performed to achieve desirable results. In particular environments, multitask processing and parallel processing may be advantageous.

A person skilled in the art can easily conceive of other implementations of the present disclosure after considering the specification and practicing the invention disclosed herein. The present application is intended to cover any variations, uses, or adaptive changes of the present disclosure, and these variations, uses, or adaptive changes follow the general principles of the present disclosure and include common knowledge or conventional technical means in the technical field that are not disclosed in the present disclosure. The specification and the embodiments are to be regarded as exemplary only, and the actual scope and spirit of the present disclosure are pointed out by the following claims.

It should be understood that the present disclosure is not limited to the precise structures that have been described above and shown in the accompanying drawings, and various modifications and changes can be made without departing from the scope of the present disclosure. The scope of the present disclosure is limited by the appended claims only.

The invention claimed is:

1. A safety belt body, comprising:

a tubular webbing having a tubular space therein;

a heating assembly secured in the tubular space, the heating assembly comprising a first printed circuit board and being used for monitoring the temperature and generating a temperature signal; and, a protector, comprising a second printed circuit board, the second printed circuit board being electrically connected to the first printed circuit board and being used for transmitting the temperature signal and an electrical signal from the heating assembly, wherein the protector further comprises a housing, the housing being sleeved and secured on the outside of the webbing, the housing having disposed therein an accommodating space, and the first printed circuit board and the second printed circuit board being located in the accommodating space.

2. The safety belt body according to claim 1, wherein:

the first printed circuit board is provided with pins, the second printed circuit board is provided with pin connectors, the second printed circuit board is located outside the webbing, and respective ends of the pins are capable of piercing through the webbing to be electrically connected to the pin connectors.

3. The safety belt body according to claim 1, wherein;

the safety belt body further comprises a fastener, and an inner wall of the housing is provided with a pin slot, wherein an end of the fastener is inserted into the pin slot after sequentially passing through the first printed circuit board, the webbing, and the second printed circuit board, to achieve securing between the first printed circuit board and the second printed circuit board and securing between the housing and the webbing.

4. The safety belt body according to claim 1, wherein the housing comprises:

a first housing located on a first side of the webbing, the first housing being provided with an engagement fastener;

a second housing located on a second side of the webbing, the second housing being provided with an engagement hook; and, wherein the engagement hook engages with the engagement fastener to achieve a detachable connection between the first housing and the second housing.

5. The safety belt body according to claim 1, wherein the protector further comprises:

an ECU connector disposed outside the housing; and, a connecting wire, two ends of the connecting wire being respectively electrically connected to the second printed circuit board and the ECU connector.

6. The safety belt body according to claim 1, wherein:

the heating assembly is secured to the webbing via an adhesive, and the adhesive is applied to one or both sides of the heating assembly.

7. The safety belt body according to claim 6, wherein:

the adhesive has a melting point of 120° C. to 140° C., and is cured via heating or cured at room temperature to adhere the heating assembly to the webbing.

8. The safety belt body according to claim 1, wherein the heating assembly further comprises:

a base body comprising a connecting portion located at an end portion of the base body;

a heating wire arranged along the length direction of the base body and secured to the base body; and, wherein the first printed circuit board is disposed on the connecting portion, and is electrically connected to the heating wire, the first printed circuit board is provided with a thermistor, one end of the thermistor is connected to the first printed circuit board, and the other end thereof extends to between sections of the heating wire to measure the temperature of the heating wire 42.

9. The safety belt body according to claim 8, wherein:

the base body comprises a nylon material or a nonwoven fabric material.

10. A safety belt heating apparatus, comprising:

a retractor;

a securing device;

the safety belt body according to claim 1, the safety belt body comprising a first end and a second end that are opposite to each other, the first end being connected to the retractor, and the second end being connected to the securing device;

a tongue sleeved on the outside of the safety belt body and capable of sliding in the length direction of the safety belt body;

a webbing clip sleeved on the safety belt body and used for limiting the position of the tongue; and, an annular guide plate sleeved on the outside of the safety belt body and used for guiding the safety belt body, the safety belt body being capable of sliding relative to the annular guide plate.

* * * * *